(12) United States Patent
Lee

(10) Patent No.: US 9,707,901 B2
(45) Date of Patent: Jul. 18, 2017

(54) PORTABLE DEVICE SUPPORT

(71) Applicant: Michael F. Lee, Windermere, FL (US)

(72) Inventor: Michael F. Lee, Windermere, FL (US)

(73) Assignee: High Gear Specialties, Inc., Orlando, FL (US)

( * ) Notice: Subject to any disclaimer, the term of this patent is extended or adjusted under 35 U.S.C. 154(b) by 217 days.

(21) Appl. No.: 14/737,685

(22) Filed: Jun. 12, 2015

(65) Prior Publication Data

US 2016/0362066 A1    Dec. 15, 2016

(51) Int. Cl.
| | |
|---|---|
| *B60R 11/02* | (2006.01) |
| *F16M 13/02* | (2006.01) |
| *B62J 11/00* | (2006.01) |
| *F16B 2/12* | (2006.01) |
| *B60R 11/00* | (2006.01) |
| *B62J 99/00* | (2009.01) |

(52) U.S. Cl.
CPC ............... *B60R 11/02* (2013.01); *B62J 11/00* (2013.01); *F16M 13/02* (2013.01); *B60R 2011/0071* (2013.01); *B60R 2011/0089* (2013.01); *B62J 2099/0033* (2013.01); *F16B 2/12* (2013.01)

(58) Field of Classification Search
CPC ............. B60R 11/02; B60R 2011/0089; B60R 2011/0074; B62J 11/00; B62J 2099/0033; F16M 13/02; F16B 2/12
USPC .......................................... 224/570, 281, 567
See application file for complete search history.

(56) References Cited

U.S. PATENT DOCUMENTS

| | | | | |
|---|---|---|---|---|
| 5,121,863 | A * | 6/1992 | Kotitalo | B60R 11/0241 224/570 |
| 5,179,590 | A * | 1/1993 | Wang | B60R 11/0241 224/482 |
| 5,187,744 | A * | 2/1993 | Richter | B60R 11/0241 224/553 |
| 5,305,381 | A * | 4/1994 | Wang | B60R 11/0241 379/426 |
| 5,788,202 | A * | 8/1998 | Richter | B60R 11/0241 224/570 |
| 5,903,645 | A * | 5/1999 | Tsay | B60R 11/0241 248/316.4 |
| 6,085,113 | A * | 7/2000 | Fan | B60R 11/0241 379/426 |
| 6,360,083 | B1 * | 3/2002 | Fan | B60R 11/0217 455/575.1 |
| 6,427,959 | B1 * | 8/2002 | Kalis | H04M 1/04 248/288.11 |
| 6,966,533 | B1 * | 11/2005 | Kalis | B60R 11/0241 248/279.1 |
| 7,407,143 | B1 * | 8/2008 | Chen | B60R 11/0241 248/309.1 |
| 7,475,858 | B2 * | 1/2009 | Kalis | B60R 11/0258 248/205.5 |

(Continued)

*Primary Examiner* — Brian D Nash
(74) *Attorney, Agent, or Firm* — Thomas L. Kautz; GrayRobinson, P.A.

(57) ABSTRACT

An apparatus for supporting cellular telephones and similar portable devices to vehicle mounts is provided in which the portable devices may be manipulated to different angular orientations relative to the vehicle without altering the connection of the vehicle mount thereto, and wherein the support is easily laterally adjustable to accommodate portable devices of different size.

25 Claims, 5 Drawing Sheets

(56) References Cited

U.S. PATENT DOCUMENTS

| | | | | |
|---|---|---|---|---|
| 7,647,676 B2* | 1/2010 | Carnevali | ............ | F16M 11/041 24/523 |
| 7,712,720 B1* | 5/2010 | Cheng | .................... | B60R 11/00 248/205.5 |
| 7,828,259 B2* | 11/2010 | Wang | .................... | B60R 11/02 248/316.4 |
| 7,925,320 B2* | 4/2011 | Pemble | ............... | B60R 11/0258 455/550.1 |
| 8,191,838 B2* | 6/2012 | Carter | .................... | B60R 11/02 16/367 |
| 8,276,863 B2* | 10/2012 | Niwai | ................ | B60R 11/0241 224/483 |
| 8,602,277 B2* | 12/2013 | Lee | .................... | B60R 11/0258 224/282 |
| 8,613,379 B2 | 12/2013 | Lee | | |
| 8,733,715 B2* | 5/2014 | Lee | .................... | B63B 35/816 114/253 |
| 8,757,461 B2* | 6/2014 | Zanetti | .................... | B60R 11/02 224/483 |
| 8,857,687 B1* | 10/2014 | An | ......................... | B60R 11/02 224/282 |
| 8,998,048 B1* | 4/2015 | Wu | ....................... | F16M 13/00 224/420 |
| 9,080,714 B2* | 7/2015 | Minn | ................ | B60R 11/0241 |
| 2006/0215836 A1* | 9/2006 | Wang | .................... | H04M 1/04 379/455 |
| 2012/0048902 A1* | 3/2012 | Clochard | ............... | B60R 11/02 224/282 |
| 2016/0257381 A1* | 9/2016 | Smith | .................... | B63B 29/04 |

* cited by examiner

PORTABLE DEVICE SUPPORT

FIELD OF THE INVENTION

This invention relates to supports for securing portable devices to vehicles, and, more particularly, to an apparatus for supporting cellular telephones and similar portable devices to vehicle mounts such that the portable devices may be manipulated to different angular orientations relative to the vehicle without altering the connection of the vehicle mount thereto, and wherein the support is laterally adjustable to accommodate portable devices of different size.

BACKGROUND OF THE INVENTION

High fuel prices and traffic congestion have made motorcycles, and motorized scooters such as those commercially available from Piaggio & Co. S.p.A. under the trademark "Vespa®", an increasingly common mode of transportation, not only for recreational purposes but for people commuting to and from their place of employment. While production vehicles of this type may include some amenities found in automobiles and other vehicles, such as a radio, they have no means of providing riders with ready access to items such as radar detectors, toll road transponders, global positioning devices (GPS), cellular telephones, cameras, change holders, garage door openers, personal digital assistants (PDA) and other portable devices.

This deficiency of production motorcycles and scooters has been addressed by aftermarket mounting devices that may be secured to different parts of the vehicle. These include handlebar mounts, control mounts, stem mounts, fairing mounts, mirror mounts and different specialty mounts. In each case, the mount generally comprises a vehicle mounting element designed to attach to a part of the vehicle, a lower pivot coupled to the vehicle mounting element, a device mounting element designed to support a number of different portable devices, an upper pivot coupled to the device mounting element, and, a shaft extending between the upper and lower pivots. The mount is connected to the vehicle and a portable device such as a GPS or cellular telephone is secured to the device mounting element, at which time the position of the device may be adjusted by manipulation of one or both of the upper and lower pivots to the satisfaction of the rider. This arrangement allows the cyclist ready access to and/or viewing of a given portable device, and reduces potentially dangerous situations wherein the rider must reach into a pocket of his or her clothing, or a storage area of the vehicle, to access a particular device while riding.

The device mounting element of aftermarket mounts noted above is typically a support plate having an array of apertures configured to align with corresponding mounting holes in the housing of a particular model or style of portable device. The location and number of such mounting holes may vary from manufacturer-to-manufacturer, and is dependent on the type of device to be connected to the support plate. As such, a number of support plates must be provided by manufacturers of aftermarket mounts in order to accommodate different types and brands of portable devices. Additionally, device mounting elements may take the form of a cradle for cellular telephones, such as shown, for example, in U.S. Pat. No. 8,613,379. But cradles of this type have limited adjustment capability which detracts from their usefulness in view of the wide variety of sizes of cellular telephones.

SUMMARY OF THE INVENTION

This invention relates to a support for securing portable devices such as cellular telephones and similar portable devices to vehicle mounts such that the portable devices may be manipulated to different angular orientations relative to the vehicle without altering the connection of the vehicle mount thereto, and wherein the support is laterally adjustable to accommodate portable devices of different size.

In one presently preferred embodiment, the support of this invention comprises a base having an extension which connects to the coupler of a vehicle mount in such a way as to form a ball-and-socket joint wherein a portion of the vehicle mounting element is received and retained within the interior of the extension in frictional engagement with a cup located therein. First and second gripper arms are carried by the base and movable toward and away from one another between an extended position and a gripping position. Each gripper arm is connected to one end of at least one pin located within the base, and the opposite end of each pin is coupled to a return spring. In response to movement of the gripper arms in a direction away from one another, toward an extended position wherein a portable device may be positioned between them, the return springs undergo compression thus exerting a force on the gripper arms urging them toward the gripping position to retain the portable device on the support.

The cup located within the interior of the extension is preferably made of rubber or similar material which frictionally engages a ball of the vehicle mount. The extension receives a locking ring which is effective to urge the wall of the extension against the ball so as to retain it within the interior of the extension while permitting movement of the ball along the cup so that the position of the portable device support relative to the vehicle may be adjusted without disconnecting and/or repositioning the vehicle mount relative to the vehicle.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
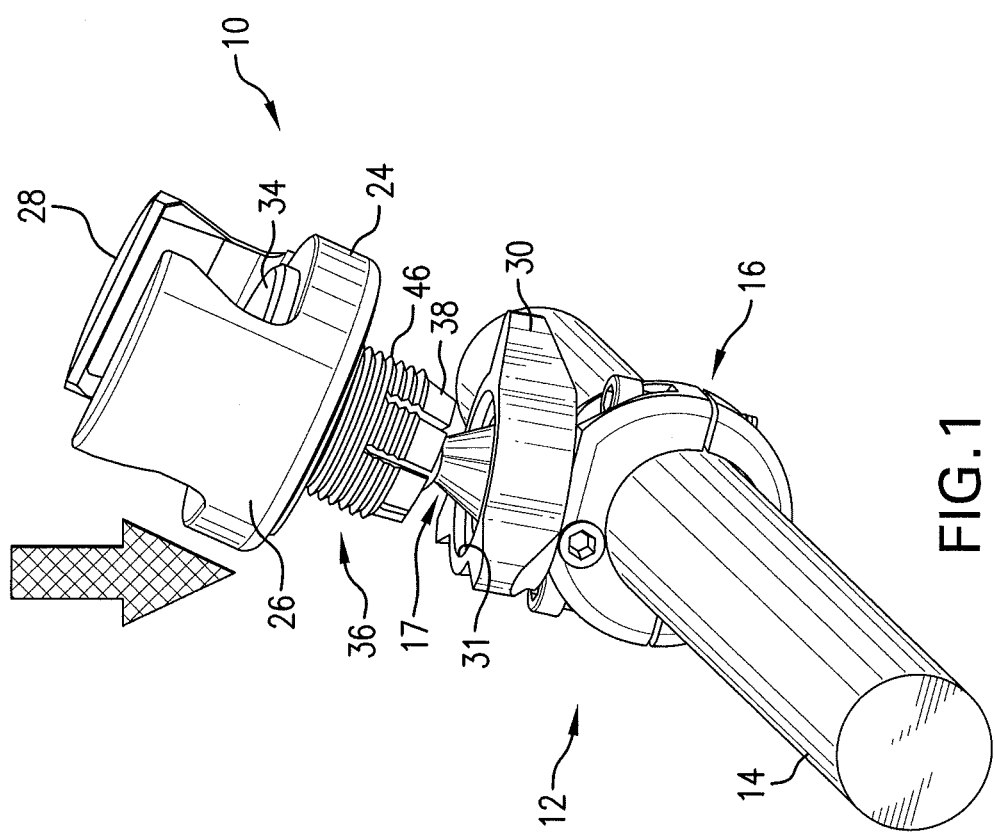
FIG. 1 is perspective view of a support for a portable device according to this invention which is shown connected to a handlebar mount for a vehicle such as a motorcycle.

Referring now to the Figs., the support 10 of this invention may be connected to a handlebar mount 12 mounted to the handlebar 14 of a motorcycle or other vehicle. The handlebar mount 12 comprises a vehicle mounting element 16 of the type described in U.S. Pat. No. 8,439,239, the disclosure of which is incorporated by reference in its entirety herein. The vehicle mounting element 16 may be connected to a coupler 17 comprising a shaft 18 formed with a projection 20 at one end and a ball 22 at the opposite end. It should be understood that the following discussion applies to any type of vehicle mount for motorcycles and other vehicles, and is not intended to be limited to the handlebar mounts 12. Additionally, for purposes of the present discussion, the turns "upper," "lower," "top," bottom," "inward" and "outward" refer to the orientation of the support 10 and mount 12 as depicted in the drawings.

Figure 2:
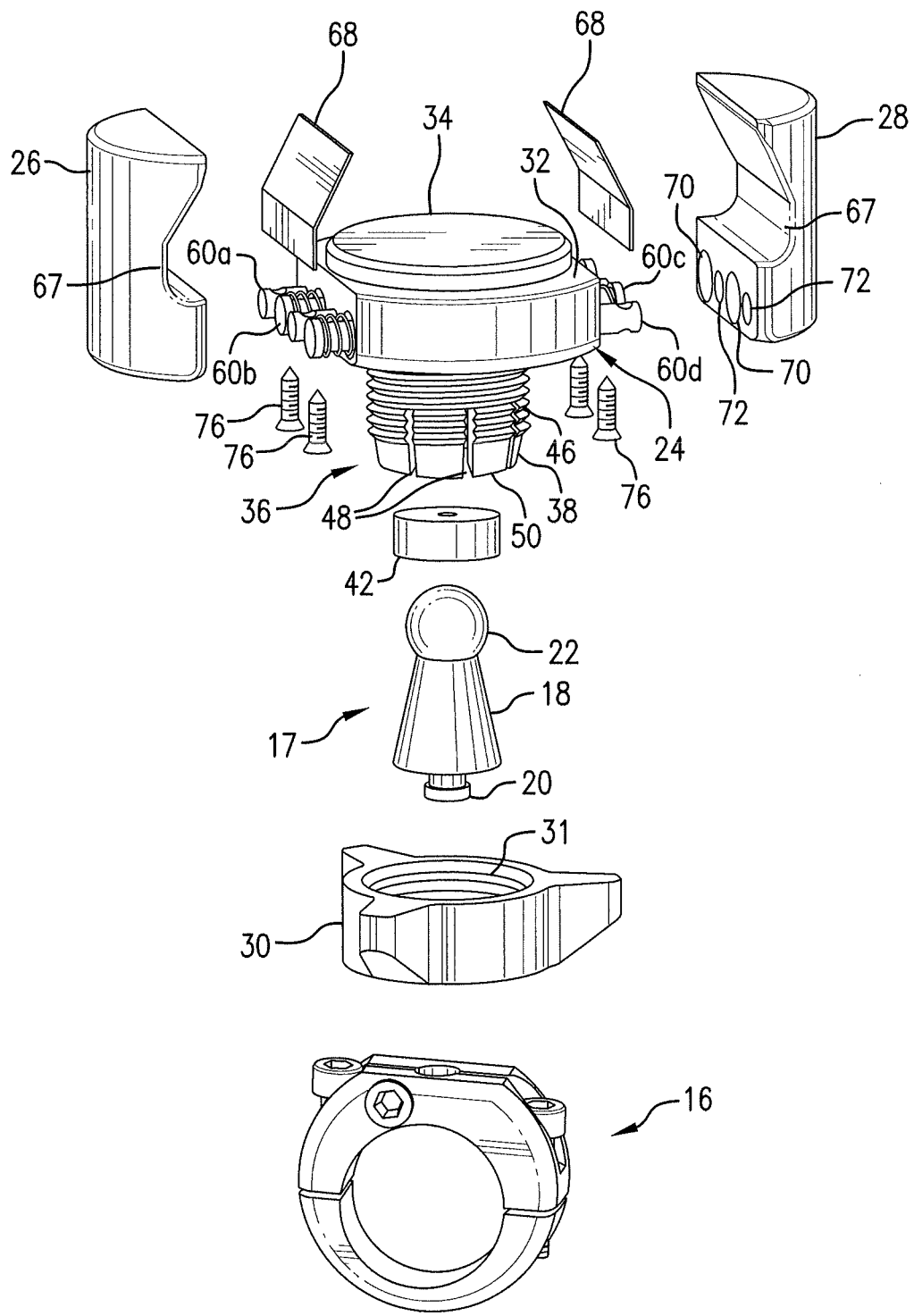
FIG. 2 is an exploded, perspective view of FIG. 1.
Figure 3:
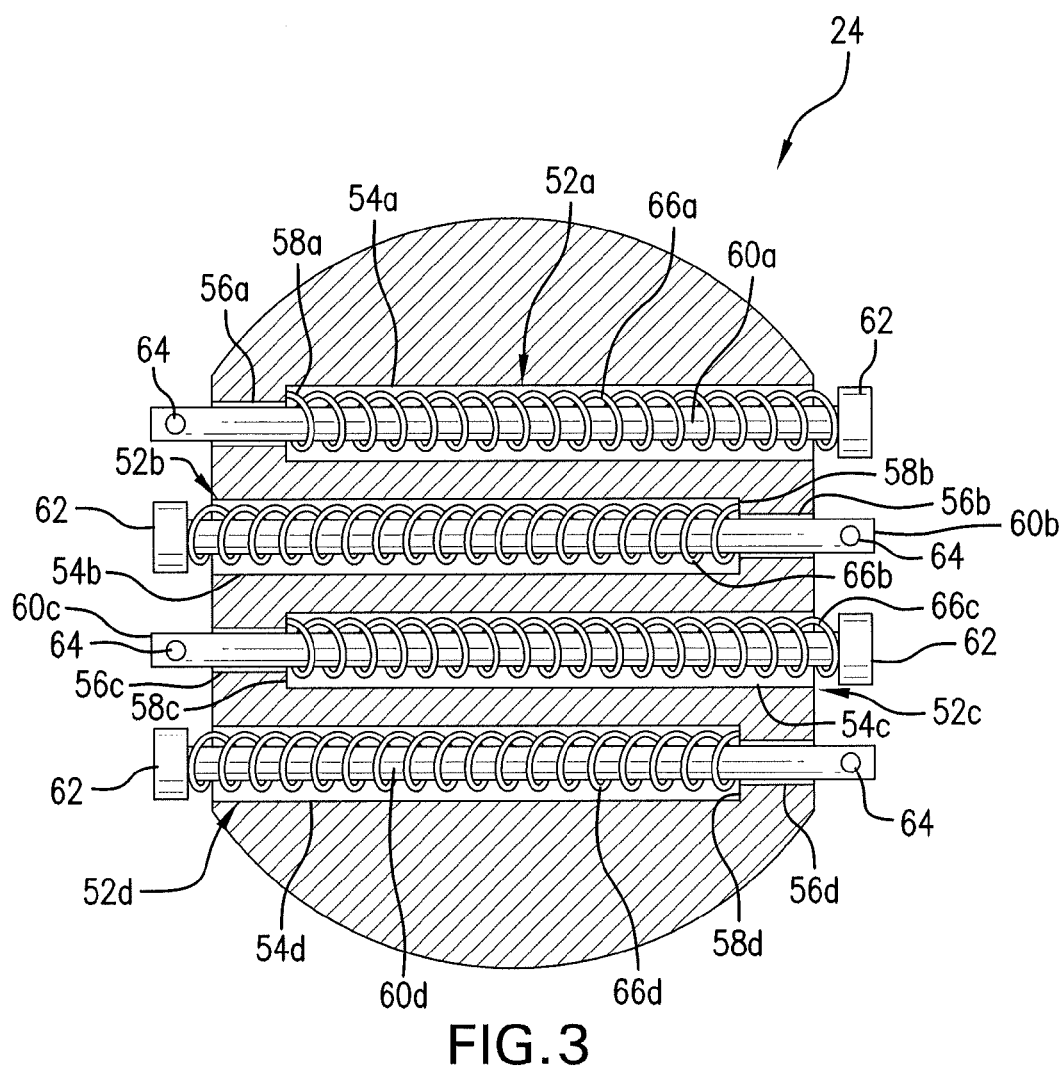
FIG. 3 is a plan view, in partial cross section, illustrating pins within the base of the portable device support and opposed gripper arms.

The support 10 comprises a base 24, first and second gripper arms 26 and 28 and a locking ring 30, each of which is described in detail below. As best seen in FIGS. 1-3, the base 24 has a top surface 32 which mounts a center pad 34 preferably formed of rubber or other material with a relatively high coefficient of friction. An extension 36 protrudes from the bottom of base 24 having a wall 38 defining a hollow interior within which a cup 42 is mounted. The cup 42 is preferably formed of rubber or similar, high friction material and is formed with a concave-shaped surface which engages the ball 22 of the coupler 17 as discussed below. The wall 38 of extension 36 is formed with external threads 46 and one or more slots 48 which extend from the bottom edge 50 of extension 36 toward the base 24. The locking ring 30 has internal threads 31 which mate with the external threads 46 on the wall 38 of extension 36. Preferably, the extension wall 38 is slightly radially inwardly tapered, in a direction from the base toward its bottom edge 50, so that when tightened down onto the extension 36 the locking ring 30 urges the wall 38 radially inwardly for purposes to become apparent below.

In the presently preferred embodiment, and as best seen in FIG. 3, the base 24 is formed with four transverse bores 52a-d extending from one side to the other, each having a larger diameter section 54a-d joined to a smaller diameter section 56a-d, respectively. A seat 58a-d is formed at the intersection of respective sections 54a-d and 56a-d. Each of the bores 52a-d receives a pin 60a-d, respectively, having a head 62 at one end and a through hole 64 at the opposite end. Coil springs 66a-d are placed along pins 60a-d such that one end of the springs 66a-d contact the head 62 of a pin 60a-d and the opposite end engages a seat 58a-d within bores 52a-d. In this position, the head 62 of each pin 60a-d protrudes outwardly from one side of the base 24, and the opposite end of each pin 60a-d, having the hole 64, protrudes outwardly from the other side of base 24.

The first and second gripper arms 26, 28 of support 10 are each formed with a recess 67 which mounts a grip pad 68 preferably formed of rubber or other material with a relatively high coefficient of friction. Each gripper arm 26, 28 is formed with two larger diameter blind bores 70 and two smaller diameter blind bores 72, all of which extend in a generally horizontal direction in the orientation depicted in FIG. 2. Two internally threaded vertical bores (not shown) are formed in each of the gripper arms 26, 28, each of which aligns with and extends substantially perpendicular to one of the blind bores 72. The gripper arms 26, 28 may be connected to the base 24 by inserting the ends of pins 60a-d into the blind bores 70, 72, and threading a screw 76 through a vertical bore 74 into one of the holes 64 in the pins 60a-d. More particularly, with reference to the right-hand side of FIG. 2 and the second gripper arm 28, the head 62 of pins 60a and 60c are each inserted into one of the larger diameter blind bores 70 in second gripper arm 28. At the same time, respective ends of pins 60b and 60d are inserted into one of the smaller diameter blind bores 70 such that the hole 64 in each pin 60b and 60d aligns with one of the vertical bores 74 in the second gripper arm 28. In this position, a screw 76 may be threaded into each vertical bore 74, and into the hole 64 of pins 60b,d, to connect the base 24 to gripper arm 28. The same procedure is followed to connect the first gripper arm 26 to the opposite side of base 24. Preferably, when the above-described assembly operation is completed, and without any portable device carried by the support 10, each of the first and second gripper arms 26 and 28 engage one side of the base 24. See FIG. 1.

Referring to FIGS. 1 and 2, the support 10 is removably connected to the handlebar mount 12 by inserting the ball 22 of coupler 17 through the locking ring 30 and into the hollow interior of extension 36 such that it contacts the cup 42. The locking ring 30 may then be tightened down along the threaded wall 38 of extension 36 to retain the ball 22 in place and in frictional engagement with the cup 42. As noted above, the wall 38 of extension 36 is slightly inwardly tapered in a direction from its bottom edge 50 toward the base 24, and formed with one or more slots 48, such that the wall 38 is urged radially inwardly as the locking ring 30 moves along the wall 38. The amount of radially inward movement of wall 38 in response to tightening of the locking ring 30, and the extent of frictional engagement between the ball 22 and cup 42, are collectively chosen to permit movement between the ball 22 and cup 42 while retaining the position of the support 10 relative to the handlebar mount 12 and handlebar 14 which is desired by the operator of the vehicle. As such, an individual may manipulate the position of the support 10 relative to the handlebar mount 12 to adjust its position, and the support 10 will remain in such adjusted position until the user changes it. This is true despite the application of vibration to the support 10, caused by operation of the vehicle under normal conditions.

Figure 4:
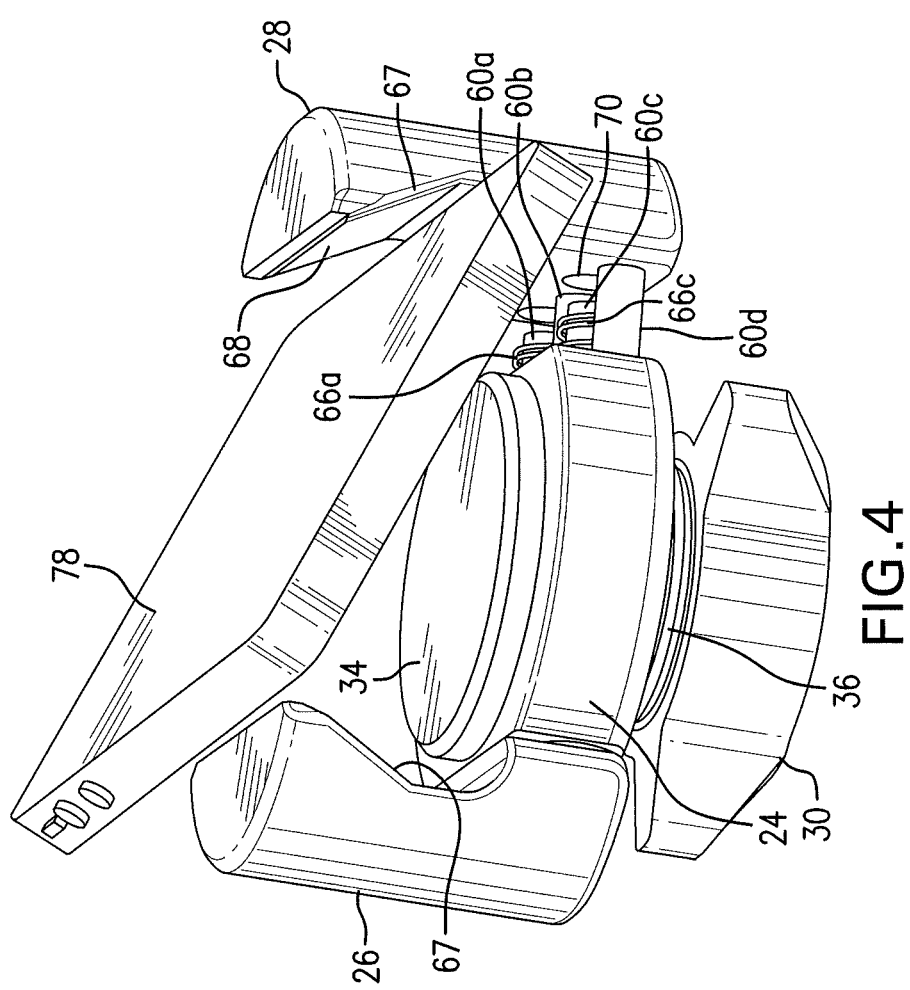
FIG. 4 is a perspective view of the assembled portable device support with its gripper arms spread apart in an extended position to receive a portable device between them.
Figure 5:
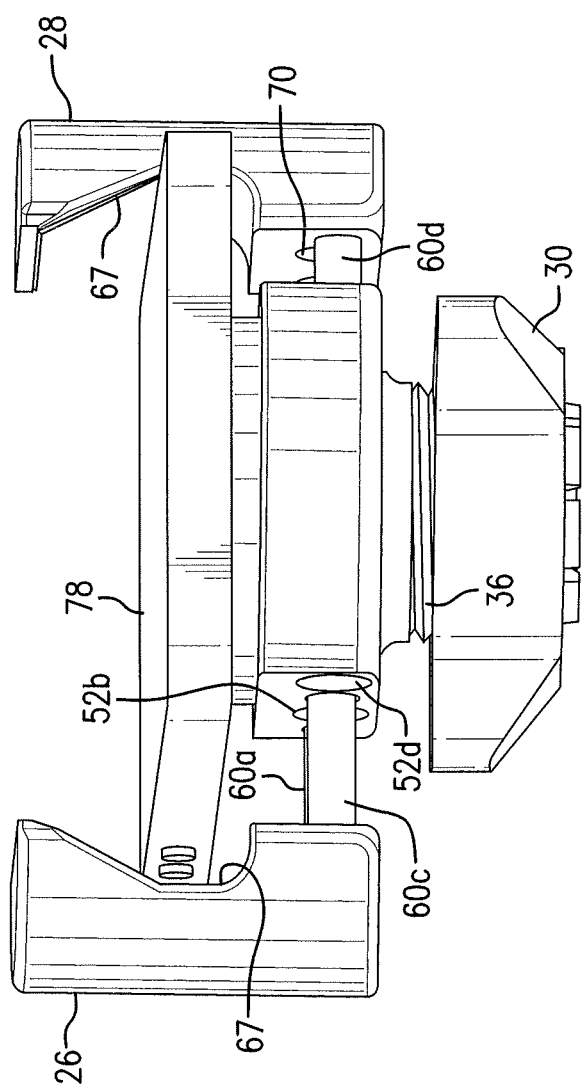
FIG. 5 is a view similar to FIG. 4 except with the portable device secured between the gripper arms.

The support 10 is effective to grip and retain a portable device 78, such as a cellular telephone or similar device, between its gripper arms 26 and 28. As shown in FIGS. 1, 4 and 5, the gripper arms 26, 28 are movable between a retracted, gripping position and an extended position. In order to receive the device 78, one or both of the gripper arms 26, 28 are moved away from one another, in a direction outwardly from the sides of the base 24, to create space between them. The extent of such outward movement is dependent on the width of the device 78, and one advantage of the support 10 of this invention is that it may accommodate devices of relatively widely varying width due to the lateral space that may be provided between the gripper arms 26, 28. In the view illustrated in FIG. 4, one edge of the device 78 may be placed within the recess 67 of second gripper arm 28 and against grip pad 68. The two gripper arms 26, 28 are separated from one another a sufficient distance to permit the opposite edge of device 78 to enter the recess 67 in first gripper arm 26 and into contact with its grip pad 68. See FIG. 5. Once the device 78 is captured between gripper arms 26, 28, its back surface rests against the center pad 34 on the base 24 to further secure the device 78 to the support 10.

In the course of movement of the gripper arm 28 to the position shown in FIGS. 4 and 5, the head 62 of each pin 60b and 60d enters the larger diameter portion 54b and 54d, respectively, of transverse bores 52b and 52d. The pins 60b, 60d are moved in this direction because their opposite ends are connected to the gripper arm 28 as discussed above. The coil springs 66b and 66d located along respective pins 60b, 60d undergo compression as such pins 60b, 60d move in the direction noted above, since springs 66b, 66d are captured between the head 62 of each pin 60b, 60d and the seats 58b, 58d within transverse bores 52b, 52d, respectively. The same is true for springs 66a and 66c located along pins 60a and 60c in response to movement of the gripper arm 26 in a direction opposite to that of gripper arm 28. Consequently, each of the springs 66a-66d exert a force on their respective pins 60a-60d which urges gripper arms 26, 28 in a direction toward one another to a gripping position wherein the device 78 is securely mounted to the support 10. The device 78 may be released by urging the gripper arms 26, 28 apart and removing it from between them.

It should be understood that the "gripping position" described above will change for portable devices of different size, e.g. a different lateral spacing between the gripper arms 26, 28 will be required for a portable device having a larger width dimension compared to another device. Similarly, the "extended position" of gripper arms 26, 28 required to receive a given portable device will be dependent on the dimensions of such device.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. For example, the Figs. and above discussion describe a portable device support 10 having four transverse bores 52a-d, four pins 60a-d and four springs 66a-d. It is contemplated that other numbers of the elements may be employed in the support 10 of this invention, such as two sets of each or more than four of each, as desired.

Therefore, it is intended that the invention not be limited to the particular embodiment disclosed as the best mode contemplated for carrying out this invention, but that the invention will include all embodiments falling within the scope of the appended claims.

The invention claimed is:

1. Apparatus for mounting a portable device, comprising:
    a base formed with a first bore and a second bore, said base having an extension adapted to connect to a vehicle mount;
    a first pin and a second pin each having opposed ends, said first pin being received within said first bore and said second pin being received within said second bore, each of said first and second pins being movable in opposite directions within respective first and second bores;
    a first gripper arm connected to one end of said first pin and a first return spring coupled to the other end of said first pin, a second gripper arm connected to one end of said second pin and a second return spring coupled to the other end of said second pin, said first and second gripper arms being movable toward and away from one another between an extended position and a gripping position, said first and second gripper arms being biased by respective first and second return springs in a direction toward one another to said gripping position, when moved to said extended position; said first and second gripper arms being effective to receive a portable device between them when in said extended position and to grip said portable device between them when in said gripping position.

2. The apparatus of claim 1 in which said extension is formed with a wall having a hollow interior and external threads, at least a portion of said wall tapering in a direction from said base toward an outer end of said extension, said wall being formed with at least one slot extending from said outer end of said extension toward said base.

3. The apparatus of claim 2 further including a locking ring having internal threads that mate with said external threads of said wall of said extension, said locking ring being movable along said extension from said outer end toward said base, said wall of said extension being urged inwardly in the course of movement of said locking ring toward said base.

4. The apparatus of claim 2 further including a cup located within said hollow interior of said extension, said cup being adapted to engage the ball of a vehicle mount.

5. The apparatus of claim 1 further including a first friction pad mounted to said first gripper arm and a second friction pad mounted to said second gripper arm, said first and second friction pads being effective to assist in retaining a portable device between said first and second gripper arms when in said gripping position.

6. The apparatus of claim 1 further including a base pad mounted to said base in position to engage a portable device gripped between said first and second gripper arms when in said gripping position.

7. The apparatus of claim 1 in which said first bore includes a first section having a first diameter and a second section having a second diameter which is smaller than said first diameter, a first seat being formed along said first bore at the juncture of said first and second sections.

8. The apparatus of claim 7 in which said first pin is formed with a head at one end and a bore at the other end, said first return spring being positioned along said first pin between said head thereof and said first seat, said other end of said first pin being connected to said first gripper arm by a fastener inserted through said bore and into said movement of said first gripper arm to said extended position thus urging said first gripper arm toward said gripping position.

9. The apparatus of claim 1 in which said second bore includes a third section having a third diameter and a fourth section having a fourth diameter which is smaller than said third diameter, a second seat being formed along said second bore at the juncture of said third and fourth sections.

10. The apparatus of claim 9 in which said second pin is formed with a head at one end and a bore at the other end, said second return spring being positioned along said second pin between said head thereof and said second seat, said other end of said second pin being connected to said second gripper arm by a fastener inserted through said bore and into said second gripper arm, said second return spring undergoing compression in the course of movement of said second gripper arm to said extended position thus urging said second gripper arm toward said gripping position.

11. The apparatus of claim 1 in which said base is formed with a third bore and a fourth bore, said apparatus further including a third pin movable in opposite directions within said third bore and a fourth pin movable in opposite directions within said fourth bore, said first gripper arm being connected to one end of said third pin and a third return spring being coupled to the other end of said third pin, said second gripper arm being connected to one end of said fourth pin and a fourth return spring being coupled to the other end of said fourth pin.

12. Apparatus for mounting a portable device, comprising:
    a base formed with a first bore, a second bore and an extension including a wall defining a hollow interior and having external threads;
    a locking ring having internal threads which mate with said external threads of said extension, said locking ring being movable along said extension, said wall of said extension being urged inwardly in the course of movement of said locking ring along said extension;

a cup located within said interior of said extension;

a first pin and a second pin each having opposed ends, said first pin being received within said first bore and said second pin being received within said second bore, each of said first and second pins being movable in opposite directions within respective first and second bores;

a first gripper arm connected to one end of said first pin and a first return spring coupled to the other end of said first pin, a second gripper arm connected to one end of said second pin and a second return spring coupled to the other end of said second pin, said first and second gripper arms being movable toward and away from one another between an extended position and a gripping position, said first and second gripper arms being biased by respective first and second return springs in a direction toward one another to said gripping position, when moved to said extended position; said first and second gripper arms being effective to receive a portable device between them when in said extended position and to grip said portable device between them when in said gripping position.

13. The apparatus of claim 12 in which said wall of said extension is formed with at least one slot.

14. The apparatus of claim 12 in which said first bore includes a first section having a first diameter and a second section having a second diameter which is smaller than said first diameter, a first seat being formed along said first bore at the juncture of said first and second sections.

15. The apparatus of claim 14 in which said first pin is formed with a head at one end and a bore at the other end, said first return spring being positioned along said first pin between said head thereof and said first seat, said other end of said first pin being connected to said first gripper arm by a fastener inserted through said bore and into said first gripper arm, said first return spring undergoing compression in the course of movement of said first gripper arm to said extended position thus urging said first gripper arm toward said gripping position.

16. The apparatus of claim 12 in which said second bore includes a third section having a third diameter and a fourth section having a fourth diameter which is smaller than said third diameter, a second seat being formed along said second bore at the juncture of said third and fourth sections.

17. The apparatus of claim 16 in which said second pin is formed with a head at one end and a bore at the other end, said second return spring being positioned along said second pin between said head thereof and said second seat, said other end of said second pin being connected to said second gripper arm by a fastener inserted through said bore course of movement of said second gripper arm to said extended position thus urging said second gripper arm toward said gripping position.

18. Apparatus for mounting a portable device, comprising:
 a vehicle mount capable of being connected to a vehicle, said vehicle mount having a coupler;
 a gripping device, comprising:
 (i) a base formed with a first bore and a second bore, said base having an extension which connects to said coupler of said vehicle mounting element;
 (ii) a first pin and a second pin each having opposed ends, said first pin being received within said first bore and said second pin being received within said second bore, each of said first and second pins being movable in opposite directions within respective first and second bores;
 (iii) a first gripper arm connected to one end of said first pin and a first return spring coupled to the other end of said first pin, a second gripper arm connected to one end of said second pin and a second return spring coupled to the other end of said second pin;
 (iv) said first and second gripper arms being movable toward and away from one another between an extended position and a gripping position, said first and second gripper arms being biased by respective first and second return springs in a direction toward one another to said gripping position when moved to said extended position, said first and second gripper arms being effective to receive a portable device between them when in said extended position and to grip said portable device between them when in said gripping position.

19. The apparatus of claim 18 in which said extension is formed with a wall having a hollow interior and external threads, at least a portion of said wall tapering in a direction from said base toward an outer end of said extension, said wall being formed with at least one slot extending from said outer end of said extension toward said base.

20. The apparatus of claim 19 further including a cup located within said hollow interior of said extension, said cup being adapted to engage the ball of a vehicle mount.

21. The apparatus of claim 20 in which said coupler is a shaft having a ball at one end, said ball being insertable into said hollow interior of said extension and into engagement with said cup.

22. The apparatus of claim 21 further including a locking ring which is effective to urge said wall of said extension into engagement with said ball of said coupler to retain said ball within said extension, said ball frictionally engaging said cup in such a way as to permit movement of said extension and said base relative to said vehicle mount in order to adjust the position of a portable device gripped between said first and second gripper arms.

23. The apparatus of claim 18 in which said first bore includes a first section having a first diameter and a second section having a second diameter which is smaller than said first diameter, a first seat being formed along said first bore at the juncture of said first and second sections.

24. The apparatus of claim 23 in which said first pin is formed with a head at one end and a bore at the other end, said first return spring being positioned along said first pin between said head thereof and said first seat, said other end of said first pin being connected to said first gripper arm by a fastener inserted through said bore and into said second gripper arm, said first return spring undergoing compression in the course of movement of said first gripper arm to said extended position thus urging said first gripper arm toward said gripping position.

25. The apparatus of claim 18 in which said second bore includes a third section having a third diameter and a fourth section having a fourth diameter which is smaller than said third diameter, a second seat being formed along said second bore at the juncture of said third and fourth sections.

* * * * *